No. 887,159. PATENTED MAY 12, 1908.
H. W. WEBB.
PROCESS OF MAKING FLEXIBLE WIRE SHAFTS.
APPLICATION FILED MAR. 26, 1907.

Witnesses
E. B. Gran
S. J. Noyes

Hartwell W. Webb
Inventor
by P. Parkersmith
Attorney for the Assignee ized to be the same as follows:

UNITED STATES PATENT OFFICE.

HARTWELL W. WEBB, OF NEWARK, NEW JERSEY, ASSIGNOR TO WEBB MANUFACTURING COMPANY, OF NEWARK, NEW JERSEY, A CORPORATION OF NEW JERSEY.

PROCESS OF MAKING FLEXIBLE WIRE SHAFTS.

No. 887,159.     Specification of Letters Patent.     Patented May 12, 1908.

Application filed March 26, 1907. Serial No. 364,735.

*To all whom it may concern:*

Be it known that I, HARTWELL W. WEBB, a citizen of the United States, residing at Newark, Essex county, New Jersey, have invented new and useful Improvements in the Process of Making Flexible Wire Shafts, of which the following is a specification.

The object of my invention is to produce a flexible wire shaft having two or more helices wound in opposite directions, in which freedom of movement between adjacent, superjacent and subjacent coils exists, and also to produce such flexible wire shaft without solid core or mandrel.

All flexible wire shafts heretofore in commercial use and made by processes formerly employed and known to me are subject to grave defects. When caused to rotate in a bent position, the friction between the various coils and between such coils and the core becomes excessive. This causes great heating of the shaft, which in turn increases the friction, and the result is loss of flexibility, rapid destruction of the shaft, and loss of power in transmission.

Flexible shafts heretofore made by known processes cannot be used to advantage when bent to a curvature whose radius is less than twenty times the diameter of the shaft. Shafts made in accordance with and embodying my invention can be used continuously and rotated at many hundreds of revolutions a minute when bent to curvatures of much less radius than that above mentioned.

I do not herein claim the flexible shaft herein shown and described, as the same is shown, described and claimed in my pending application Serial No. 356,449, filed February 8, 1907.

Figure 1:
Figure 2:
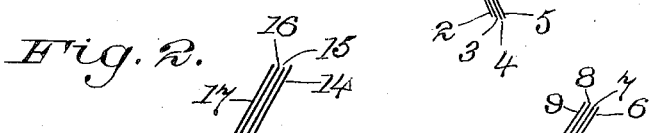
Figure 3:
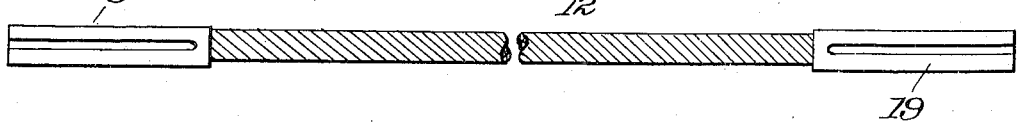

A flexible shaft made in accordance with my improved method is illustrated in various stages of manufacture in the accompanying sheet of drawings, in which Figure 1 represents the winding of the first layer of wire upon a mandrel. Fig. 2 represents a completed shaft partly unwound to show the arrangement of the several layers of wire. Fig. 3 represents a completed shaft with ends capped with suitable couplings ready for use. Figs. 4, 5, 6, and 7 are exaggerated illustrative views to show the conditions of the wire helices at different points in the process of manufacture.

Throughout the drawings, like reference figures indicate like parts.

1 represents a mandrel preferably formed of a wire clamped at the ends in any convenient manner so as to render the wire tight. On this are wound one or more strands of wire in the form of helices, preferably by rotating the mandrel. As shown there are four strands of wire, 2, 3, 4 and 5, which are wound side by side upon the mandrel, each coil of each helix being in contact with the adjacent coils of the helices on either side. When the helices extend nearly the entire length of the mandrel the strands of wire are cut, and the mandrel withdrawn from the helices. The wire helix, or series of interlocked helices thus formed is then used as a mandrel upon which are similarly wound one or more strands of wire in a direction opposite to that in which the wire forming the first helix or set of helices was wound. As shown, four wires 6, 7, 8 and 9 are thus wound. Upon this helix or these helices, more strands of wire may be wound, as indicated at 10, 11, 12 and 13, and at 14, 15, 16 and 17, in Fig. 2, each layer being wound in a direction opposite to that in which the superjacent and subjacent layers are wound. All the helices are tightly wound so that the adjacent, superjacent and subjacent coils are in close contact, and the contact of the coils is so close that the tube thus formed is practically gas tight as I have determined by experiment. The wire helix, or series of interlocked helices first formed, when used as a mandrel for the winding of the second set of coils, will usually stretch or increase in length as new coils of wire are wound tightly about it, such winding tending to reduce the diameter of the inner helix and consequently increase its length. In order to make up for this the inner helix should be slightly stretched before the winding of the second set of coils about it as a mandrel is begun, and additional stretching may be necessary as the winding of the second set of coils proceeds.

After the desired number of layers of wire have been wound up to form the flexible shaft, the free ends of the wire strands are confined by suitable clamps and the several strands of wires fastened together by brazing or in any suitable manner. Splined tubes 18, and 19, or other suitable couplings are then fastened upon the ends of the shaft by soldering or in any other suitable manner. I may say that at the ends of the second and all succeeding windings, except the last, the wire strands are preferably not cut, but said strands are wound back upon the previous layer to form the next helix of opposite direction. Thus at the completion of the winding when the wire strands are finally cut, as at 14, 15, 16 and 17, that end of the shaft alone develops any tendency of the wire strands to unwind.

In winding shafts of larger sizes of wire, it is well to lubricate the strands of wire with a slight quantity of oil, and I find lard-oil or animal oil to give the best results.

The shaft as above formed naturally has the superposed layers of wire tightly wound one upon another and the several coils of each layer pressed firmly together, as above pointed out. Evidently friction will occur to a high degree when such a shaft is bent and rotated at a high rate of speed. As such shafts are nearly always driven at high speeds and used in situations where rotary motion has to be transmitted out of a fixed straight line, it is evident that this friction will be highly deleterious. It will absorb a portion of the power, diminishing the efficiency of the shaft as a means of power transmission, and will generate a degree of heat which is destructive to the shaft. I have known flexible shafts formed of tightly coiled wire to generate enough heat from internal friction to melt the solder on them. The next step of my process puts the completed shaft in a condition which practically eliminates the possibility of developing such a harmful degree of internal friction by any ordinary use of the shaft.

Figure 4:
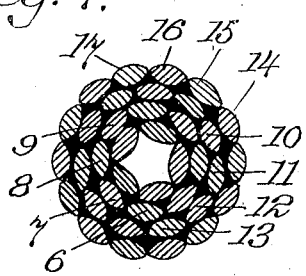
Figure 5:
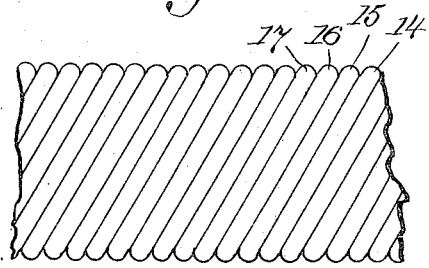
Figure 6:
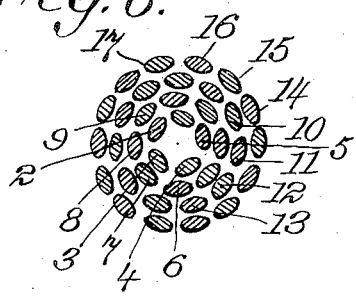
Figure 7:
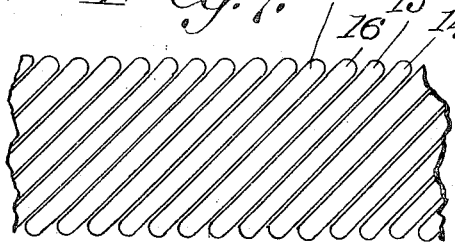

I take the shaft after the strands of wire are wound as above described and stretch the same as a whole, lengthwise, to an extent slightly beyond the elastic limit of the structure as a whole. This has the effect of slightly separating the adjacent, superjacent and subjacent coils of the several helices, and leaving them in this position of slight separation. This is indicated to an exaggerated degree in Figs. 6 and 7. The effect of lengthening each helix is to slightly decrease its diameter and increase its pitch. Thus the helix shown in Fig. 5 is reduced to the form shown in Fig. 7. This slightly separates the coils along the line of the axis of the helix as can be shown by mathematical computation, and also demonstarted practically by passing gas through the helix as a tube. When this is done before stretching, the tube is gas tight, as hereinbefore stated, but when gas is passed through the helix after it has been stretched, it permits the gas to escape between the coils. Such stretching also reduces the diameter of the superposed helices to varying extents inversely proportional to the diameter of said helices. This separates the several layers of wire along lines radial of the helices. That is to say, the inmost helix has its diameter reduced more than that of the second layer, and the coils of the inmost helix are so pulled away from close contact with coils of the second layer. The second helix is, however, reduced in diameter still more than the third helix, and the third helix is reduced in diameter still more than the fourth, and so on. This also is capable of mathematical demonstration, and is practically proven by the fact that shafts which have been stretched, as above described, can be operated without substantial heating when bent into curves of a diameter only a small multiple of the diameter of the shaft itself. Attempts to operate under these conditions a shaft which had not been thus stretched will result immediately in destructive heating, as before stated. This separation of the coils of the several helices along lines radial of the shaft, as well as along lines circumferentially and longitudinally of the shaft, produced by stretching the shaft as a whole, is illustrated in cross section in Fig. 6, while Fig. 4 shows all the strands in close contact as they are left by the winding operation before stretching.

The advantages of my invention, as before intimated, comprise the heightening of the flexibility of the shaft by reducing internal friction and tendency to crystallization by eliminating the solid core, and relieving the various coils of wire from close contact and pressure one by the other, the avoidance of destructive heating in use, the consequent prolonging of the life of the shaft, and the increasing of its efficiency as a means for transmitting power.

While my invention applies most advantageously to hollow shafts, it might also be applied to shafts with solid cores made of some extensible material. While I have shown shafts formed by simultaneously winding a plurality of strands of wire into helices of the same diameter to form each layer, the use of such plurality of strands is not necessary, and while I have found the winding of the wire in four superposed layers to produce a shaft to give good results, any different number of such layers may be employed. I find also that in winding shafts in accordance with my invention, a high tempered wire may be used, while in the old form of spirally wound shaft, softer wire was employed. I find also that spirally wound shafts which have not had their coils freed by stretching, as above described, are liable to break short off near the end at which the power is applied. This I believe is caused by the localization of the twisting strain due to the tight binding of one coil on another which permits no springing of the coils.

This local breaking action does not occur in shafts made according to my invention. This I believe is because the coils may spring and shift one over the other so as to distribute the torsional strain over a considerable length of each helix.

Having, therefore, described my invention, I claim:

1. The process of making a flexible shaft out of one or more strands of wire, which comprises the following steps: first, winding one or more strands of wire upon a mandrel; second, removing the mandrel; third, winding one or more strands of wire upon the first helix as a mandrel in a direction opposite to that in which the wire forming said first helix was wound; fourth, stretching the shaft so formed lengthwise to an extent slightly beyond the elastic limit of the structure as a whole.

2. The process of making a flexible shaft out of wire which comprises the following steps: first, winding one or more strands of wire to form a helix upon a mandrel so that adjacent coils of said wire are in contact; second, removing the mandrel; third, winding one or more strands of wire upon the first helix as a mandrel in a direction opposite to that in which the wire forming said first helix was wound; fourth, confining the free ends of said strands of wire in suitable caps; fifth, stretching lengthwise the shaft so formed and slightly separating the adjacent, superjacent and subjacent coils of the several helices.

3. The process of making a flexible shaft out of one or more strands of wire, which comprises the following steps: first, winding one or more strands of wire into a helix; second, winding one or more strands of wire upon the first helix in a direction opposite to that in which the wire forming said first helix was wound; third, stretching lengthwise the shaft so formed to an extent slightly beyond the elastic limit of the structure as a whole.

4. The process of making a flexible shaft out of one or more strands of wire which comprises the following steps: first, winding one or more strands of wire into a close helix so that adjacent coils of said helix are in contact; second, winding one or more strands of wire upon the first helix in a direction opposite to that in which the wire forming said first helix was wound, the adjacent coils of said second helix also being in contact; third, stretching lengthwise the shaft so formed to slightly separate the adjacent and subjacent coils of the several helices.

5. The process of making a flexible shaft out of one or more strands of wire which comprises the following steps: first, winding one or more strands of wire into a close helix so that adjacent coils of said helix are in contact; second, winding one or more strands of wire upon the first helix in a direction opposite to that in which the wire forming said first helix was wound, the adjacent coils of said second helix also being in contact; third, confining the free ends of the wire strands by fastening a metal cap thereon; fourth, stretching lengthwise the shaft so formed to slightly separate the adjacent and subjacent coils of the several helices.

HARTWELL W. WEBB.

Witnesses:
A. A. BERGNER,
MAY E. CONROY.